US009522759B2

(12) United States Patent
Darr et al.

(10) Patent No.: US 9,522,759 B2
(45) Date of Patent: *Dec. 20, 2016

(54) LIGHTWEIGHT PLASTIC CONTAINER AND PREFORM

(71) Applicant: Plastipak Packaging, Inc., Plymouth, MI (US)

(72) Inventors: Richard C. Darr, Medina, OH (US); Edward V. Morgan, Northville, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,731

(22) Filed: Jul. 27, 2016

(65) Prior Publication Data

US 2016/0332766 A1 Nov. 17, 2016

Related U.S. Application Data

(60) Continuation of application No. 14/803,505, filed on Jul. 20, 2015, now Pat. No. 9,403,310, which is a
(Continued)

(51) Int. Cl.
*B65D 1/02* (2006.01)
*B29C 49/06* (2006.01)
(Continued)

(52) U.S. Cl.
CPC ............... *B65D 1/023* (2013.01); *B29C 49/06* (2013.01); *B65D 1/0246* (2013.01); *B65D 1/40* (2013.01);
(Continued)

(58) Field of Classification Search
CPC ............ B29B 2911/14726; B29B 2911/14686; B29B 2911/14466; B29B 2911/14666; B29B 2911/14626; B29B 11/08; B29B 2911/14746; B29B 2911/1444; B29B 11/14; B29B 2911/14446; B29K 2105/258; B29K 2067/00; B29K 2105/26; B65D 1/023
(Continued)

(56) References Cited

U.S. PATENT DOCUMENTS 3,398,427 A 8/1968 John
3,881,622 A 5/1975 Dockery
(Continued)

FOREIGN PATENT DOCUMENTS

DE 20 2005 017 075 U1 3/2006
EP 1714887 A1 10/2006
(Continued)

*Primary Examiner* — Robert J Hicks
*Assistant Examiner* — Kareen Thomas
(74) *Attorney, Agent, or Firm* — Dykema Gossett PLLC

(57) ABSTRACT

A plastic container is provided that includes a lower supporting base portion; a sidewall portion extending upwardly from the base portion; and a neck portion extending upwardly from the sidewall portion. The neck portion includes a support flange having an upper and lower surface, a tamper-evident formation, and a dispensing opening at the top of the neck portion. In an embodiment, the volume of the container is at least 500 ml; the weight of the neck portion is 3.0 grams or less; and the vertical distance from the top of the dispensing opening to the lower surface of the support flange, including the threads and the tamper-evident formation, is 0.580 inches or less. A preform and method for making a container are also disclosed.

30 Claims, 3 Drawing Sheets

Related U.S. Application Data continuation of application No. 14/688,734, filed on Apr. 16, 2015, now Pat. No. 9,139,326, which is a continuation of application No. 14/511,848, filed on Oct. 10, 2014, now Pat. No. 9,033,168, which is a division of application No. 11/749,501, filed on May 16, 2007, now Pat. No. 8,857,637, which is a continuation-in-part of application No. 11/368,860, filed on Mar. 6, 2006, now Pat. No. 7,708,159.

(51) Int. Cl.
*B65D 1/40* (2006.01)
*B65D 43/02* (2006.01)
*B65D 1/44* (2006.01)
*B29K 67/00* (2006.01)
*B29K 105/00* (2006.01)
*B29L 31/00* (2006.01)

(52) U.S. Cl.
CPC ............. *B65D 1/44* (2013.01); *B65D 43/0235* (2013.01); *B29K 2067/003* (2013.01); *B29K 2105/258* (2013.01); *B29L 2031/7158* (2013.01)

(58) Field of Classification Search
USPC .. 220/640, 643, 645, 656, 657, 659; 215/40, 42, 44, 252
See application file for complete search history.

(56) References Cited

U.S. PATENT DOCUMENTS

| | | | |
|---|---|---|---|
| 4,180,175 A | 12/1979 | Virog, Jr. et al. | |
| 4,463,056 A | 7/1984 | Steele | |
| 4,541,536 A | 9/1985 | Davis et al. | |
| 4,615,667 A | 10/1986 | Roy | |
| 4,715,504 A | 12/1987 | Chang et al. | |
| 4,756,438 A | 7/1988 | Ryder | |
| 4,830,251 A | 5/1989 | Conrad | |
| 4,842,153 A | 6/1989 | Hulon | |
| 5,040,692 A | 8/1991 | Julian | |
| 5,143,235 A | 9/1992 | Repp | |
| 5,366,774 A | 11/1994 | Pinto et al. | |
| 5,403,538 A | 4/1995 | Maeda | |
| 5,464,106 A | 11/1995 | Slat | |
| 5,674,448 A | 10/1997 | Slat et al. | |
| 5,688,572 A | 11/1997 | Slat et al. | |
| 5,756,172 A | 5/1998 | Semersky | |
| 5,804,305 A | 9/1998 | Slat et al. | |
| 5,888,598 A | 3/1999 | Brewster et al. | |
| 5,927,525 A | 7/1999 | Darr et al. | |
| 5,954,216 A | 9/1999 | Meisner et al. | |
| 6,063,325 A | 5/2000 | Nahill et al. | |
| 6,085,924 A | 7/2000 | Henderson | |
| 6,168,749 B1 | 1/2001 | Koch | |
| 6,203,870 B1 | 3/2001 | Darr | |
| 6,276,546 B1 | 8/2001 | Davis et al. | |
| 6,305,564 B1 | 10/2001 | Takeuchi et al. | |
| 6,391,408 B1 | 5/2002 | Hutchinson | |
| 6,461,697 B1 | 10/2002 | Slat et al. | |
| 6,548,133 B2 | 4/2003 | Schmidt et al. | |
| 6,557,714 B2 | 5/2003 | Babcock et al. | |
| 6,568,156 B2 | 5/2003 | Silvers et al. | |
| 6,635,325 B1 | 10/2003 | Hebert | |
| 6,641,774 B2 | 11/2003 | Slat et al. | |
| 6,673,303 B2 * | 1/2004 | White | B29C 49/0073 264/524 |
| 6,779,677 B2 | 8/2004 | Chupak | |
| 6,796,450 B2 | 9/2004 | Prevot et al. | |
| 6,808,820 B2 | 10/2004 | Lee | |
| 6,837,390 B2 | 1/2005 | Lane et al. | |
| 6,841,262 B1 | 1/2005 | Beck et al. | |
| 6,929,139 B2 | 8/2005 | Darr | |
| 6,939,591 B2 | 9/2005 | Hutchinson et al. | |
| 6,977,104 B1 | 12/2005 | Nahill et al. | |
| 7,080,747 B2 | 7/2006 | Lane et al. | |
| 7,150,902 B2 * | 12/2006 | Farha | C08J 7/047 215/12.1 |
| 7,332,204 B2 | 2/2008 | Hutchinson | |
| 7,531,226 B2 | 5/2009 | Lee et al. | |
| 7,553,441 B2 | 6/2009 | Shi | |
| 7,882,977 B2 * | 2/2011 | Johnson | B65D 41/0471 215/214 |
| 8,308,005 B2 | 11/2012 | Penny | |
| 2001/0038171 A1 | 11/2001 | Darr | |
| 2001/0054779 A1 | 12/2001 | Collette et al. | |
| 2002/0162818 A1 | 11/2002 | Williams | |
| 2003/0041568 A1 | 3/2003 | Seidita | |
| 2003/0071007 A1 | 4/2003 | Ma et al. | |
| 2003/0116522 A1 | 6/2003 | Julian et al. | |
| 2003/0155320 A1 | 8/2003 | Peronek et al. | |
| 2003/0235667 A1 | 12/2003 | Darr et al. | |
| 2004/0084333 A1 | 5/2004 | Boyd | |
| 2004/0129669 A1 | 7/2004 | Kelley et al. | |
| 2004/0146675 A1 | 7/2004 | Hashimoto et al. | |
| 2005/0053739 A1 | 3/2005 | Lee et al. | |
| 2005/0139566 A1 | 6/2005 | Uesugi et al. | |
| 2005/0153089 A1 | 7/2005 | Lynch et al. | |
| 2005/0158495 A1 | 7/2005 | Nahill | |
| 2005/0167879 A1 | 8/2005 | Smith | |
| 2005/0258127 A1 | 11/2005 | Darr | |
| 2006/0207961 A1 | 9/2006 | Kurtz | |
| 2007/0087214 A1 | 4/2007 | Portnoy et al. | |
| 2007/0108668 A1 | 5/2007 | Hutchinson et al. | |
| 2007/0175855 A1 | 8/2007 | Penny | |
| 2007/0224374 A1 | 9/2007 | Kelly | |
| 2007/0257001 A1 | 11/2007 | Paz | |
| 2008/0050546 A1 | 2/2008 | Kitano et al. | |
| 2008/0290099 A1 | 11/2008 | MacDonald et al. | |

FOREIGN PATENT DOCUMENTS

| | | |
|---|---|---|
| EP | 1885602 B1 | 10/2010 |
| FR | 2846946 A1 | 5/2004 |
| WO | 9829314 A1 | 7/1998 |
| WO | 9961325 A1 | 12/1999 |
| WO | 9961337 A2 | 12/1999 |

* cited by examiner

LIGHTWEIGHT PLASTIC CONTAINER AND PREFORM

CROSS-REFERENCE TO RELATED APPLICATIONS

This application is a continuation of U.S. patent application Ser. No. 14/803,505, filed Jul. 20, 2015, which is a continuation of U.S. patent application Ser. No. 14/688,734, filed Apr. 16, 2015, now U.S. Pat. No. 9,139,326, which is a continuation of U.S. patent application Ser. No. 14/511,848, filed Oct. 10, 2014, now U.S. Pat. No. 9,033,168, which is a divisional of U.S. patent application Ser. No. 11/749,501, filed May 16, 2007, now U.S. Pat. No. 8,857,637, which is a continuation-in-part of U.S. patent application Ser. No. 11/368,860, filed Mar. 6, 2006, now U.S. Pat. No. 7,708,159, all of which are incorporated herein by reference in their entirety.

TECHNICAL FIELD

The present invention relates to plastic containers, including injection molded and/or blow molded containers.

BACKGROUND

It is desirable to improve the stability of plastic containers and the handling of preforms that are used to form containers. At the same time, for economic and efficiency reasons, it is also desirable to provide containers and preforms that are suitable for their intended applications yet have a reduced weight.

SUMMARY

A plastic container is provided that includes a hollow body portion including a lower supporting base portion; a sidewall portion extending upwardly from the base portion; and a neck portion extending upwardly from the sidewall portion. The neck portion includes a support flange having an upper and lower surface, a tamper-evident formation, and a dispensing opening at the top of the neck portion. In an embodiment, the dispensing opening has an inner diameter that is at least 22 mm, and the vertical distance from the top of the dispensing opening to the lower surface of the support flange is 0.580 inches or less. A preform and method for making a container are also disclosed.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figures 1, 2:
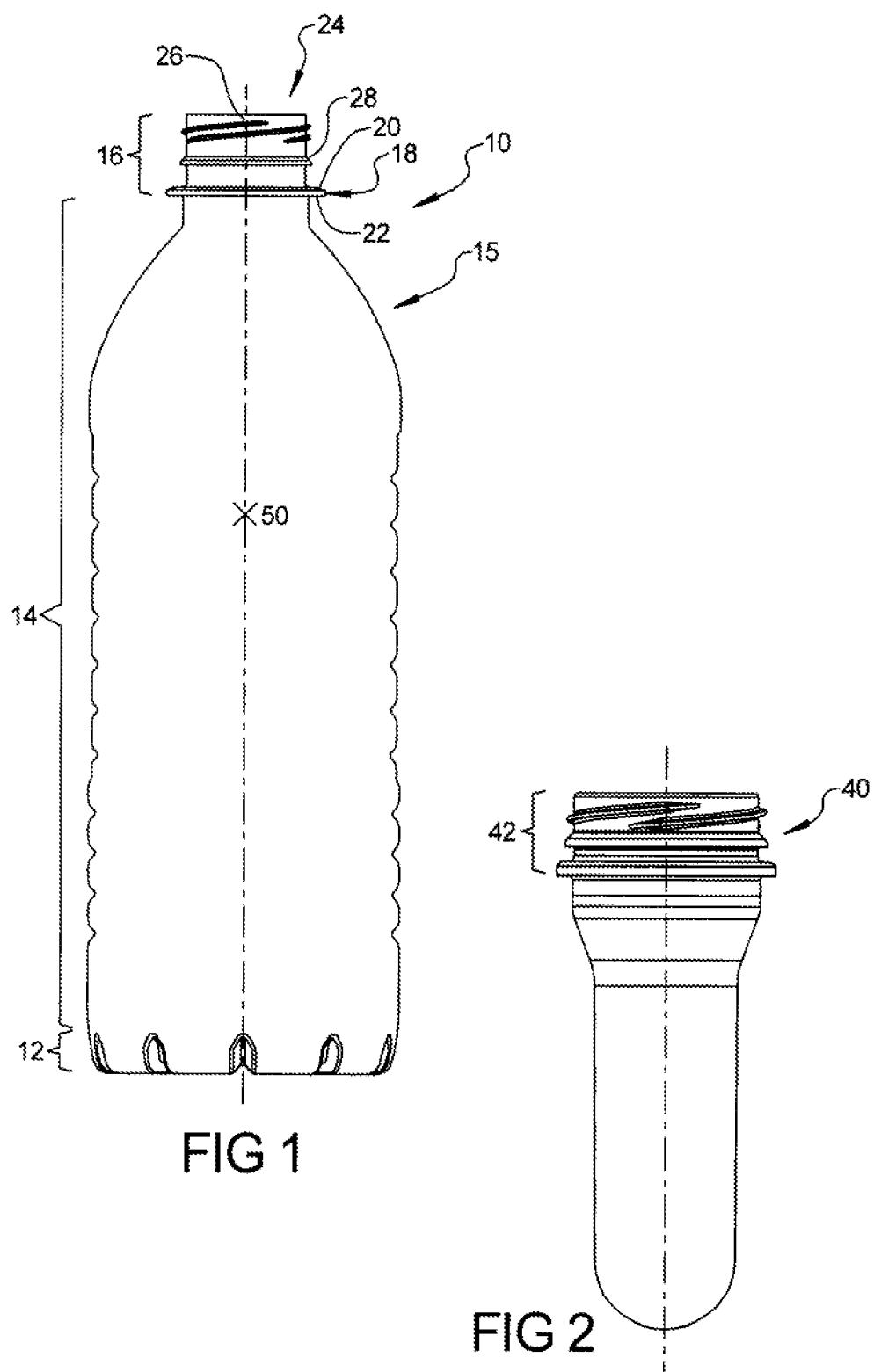
FIG. 1 is a front elevational view of a plastic container according to an embodiment of the invention.
FIG. 2 is a front elevation view of a preform according to another embodiment of the invention.

A representative container 10 according to an embodiment of the present invention is generally shown in FIG. 1. Container 10 includes a lower supporting base portion 12, a sidewall portion 14, and a neck portion 16.

The sidewall portion may be cylindrical or non-cylindrical, and may include various formations, for example, without limitation, label panels, strengthening ribs, etc. The neck portion 16 includes a support flange 18 having an upper surface 20 and a lower surface 22. Support flange 18 is generally provided to facilitate the handling of containers, during formation and thereafter. Neck portion 16 further includes a tamper-evident formation 28 and a dispensing opening 24 positioned at, and formed by, the top of the neck portion 16. In an embodiment, the dispensing opening has an inner diameter that is at least 22 mm. However, the dispensing opening may be of various conventional or non-conventional sizes and may, for example, comprise a circular opening having an inner diameter from 22 mm to 29 mm.

Container 10 is comprised of plastic. In an embodiment, the container may be comprised of polymer, such as a polymer that provides good visual clarity when bi-axially oriented like polyethylene terephthalate (PET). However, the invention is not limited to a specific polymer, and containers and preforms that are provided according to the teachings of the present invention may be comprised of a wide number of polymers and/or blends, including those that included recycled material.

The tamper-evident formation 28, may be continuous or, as generally illustrated, may include one or more discontinuous formations. In an embodiment, the tamper-evident formation 28 is comprised of a discontinuous tamper bead. In other embodiments, the tamper-evident formation may comprise a formation (e.g., a lug or lugs) that extends from the upper and/or lower surface of the support ring. However, the invention is not limited to the illustrated means for indicating tampering and other means for indicating tampering, such as a covering (e.g., a foil covering) may be used instead of or in addition to other tamper-evident formations.

Embodiments of the container may additionally include a shoulder portion 15 and a plurality of threads 26 for receiving a closure (not shown). Shoulder portion 15 may comprise an upper portion of the sidewall portion 14, and may extend inwardly into the neck portion 16, although many container configurations do not include a shoulder portion. A feature of containers according to embodiments of the present invention is a lowering of the center of gravity. For most configurations and applications, a lower center of gravity provides a container that is more stable and less likely to tip during manufacturing, processing, and/or handling. The center of gravity is the point at which if a body is suspended it would be perfectly balanced. For uniformly consistent, symmetrical bodies, the center of gravity is at the geometrical center. For non-consistent or non-symmetrical bodies, the center of gravity needs to be determined. Moreover, for purposes of the instant disclosure, the center of gravity is associated with preforms and with containers that are in an unfilled condition.

The center of gravity for container 10 illustrated in FIG. 1 is generally shown at 50. It is noted that for the instant container configuration, the center of gravity 50 is above the mid-height of the container due to the additional material, and hence weight, that is provided in the container finish portion—i.e., the neck portion 16. However, as described further herein, with a reduction in the vertical length and weight of the neck portion 16 (or elements thereof), the center of gravity for a container produced in accordance with the teachings of the present invention may have a center of gravity (e.g., 50) that is vertically lower than that of a container that employs a conventional (vertically longer and heavier) neck portion. For example, without limitation, the ratio of the vertical height of the center of gravity to the vertical height of the container may be less than 0.57. Notably, for some embodiments the ratio may be less than 0.53.

Additionally, in an embodiment of the invention, portions of the container—exclusive of the neck portion—may be stretched (e.g., in a stretch blow molding operation) to more than 3 times their initial (i.e., preform component) length in the axial direction.

As one would also expect, with a reduction in the vertical length and weight of the neck portion, the center of gravity for an associated preform will also be reduced when compared to an preform of like material and design below the neck portion that includes a longer vertical and heavier neck portion.

Figure 3:
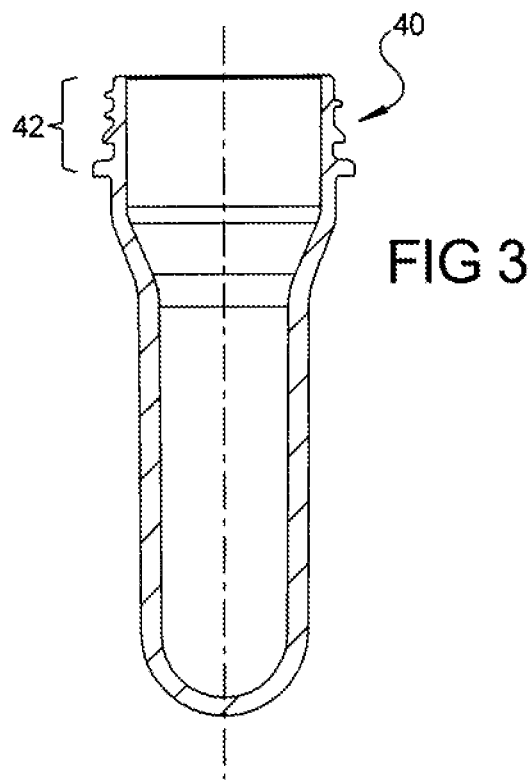
FIG. 3 is a cross-sectional view of a preform according to an embodiment of the invention.
Figure 4:
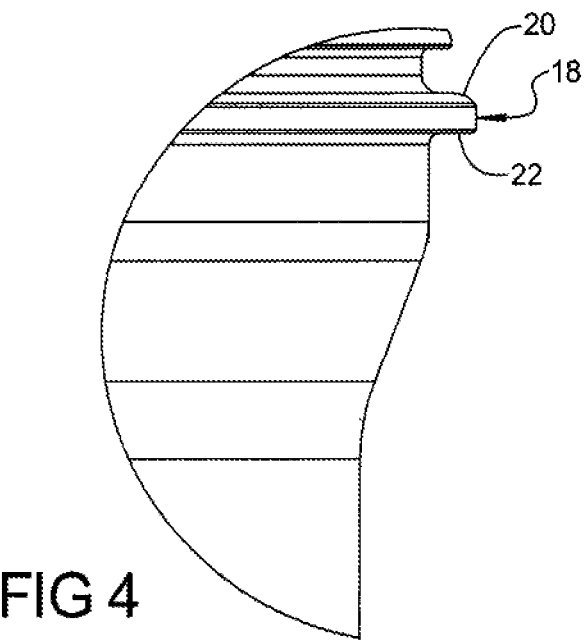
FIG. 4 is a partial enlarged view of the area illustrated in FIG. 2.

FIGS. 2 and 3 generally illustrate a preform 40 according to an embodiment of the invention. Preform 40 can, for instance, be used to form a wide variety of containers, including a container such as that illustrated in FIG. 1. By way of example, without limitation, preform 40 may be injection molded and/or blow molded, and may form an almost limitless number of container configurations. FIG. 4. depicts an enlarged portion of FIG. 2.

Preform 40 is also shown including a neck portion 42. For many applications, the neck portion provided in connection with a preform will remain substantially the same, and have substantially the same dimensions, as the neck portion of a molded container produced from the preform. Consequently, the neck portion 16 of the container 10 and the neck portion 42 of the preform may be substantially consistent, while the remaining portions of the preform and container—i.e., those below the respective neck portions—may change significantly. For ease of reference, common elements in the neck portion of the illustrated container and the neck portion of the illustrated preforms are provided with common reference numerals.

Figure 5:
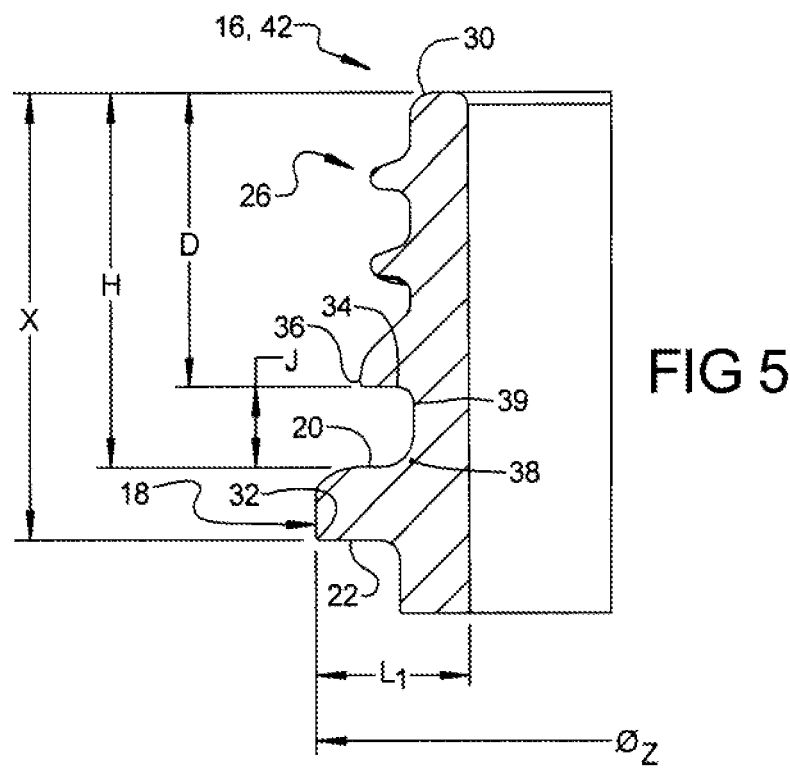
FIG. 5 is a partial cross sectional view of an upper portion of a container or preform according to an embodiment of the invention.
Figure 6:
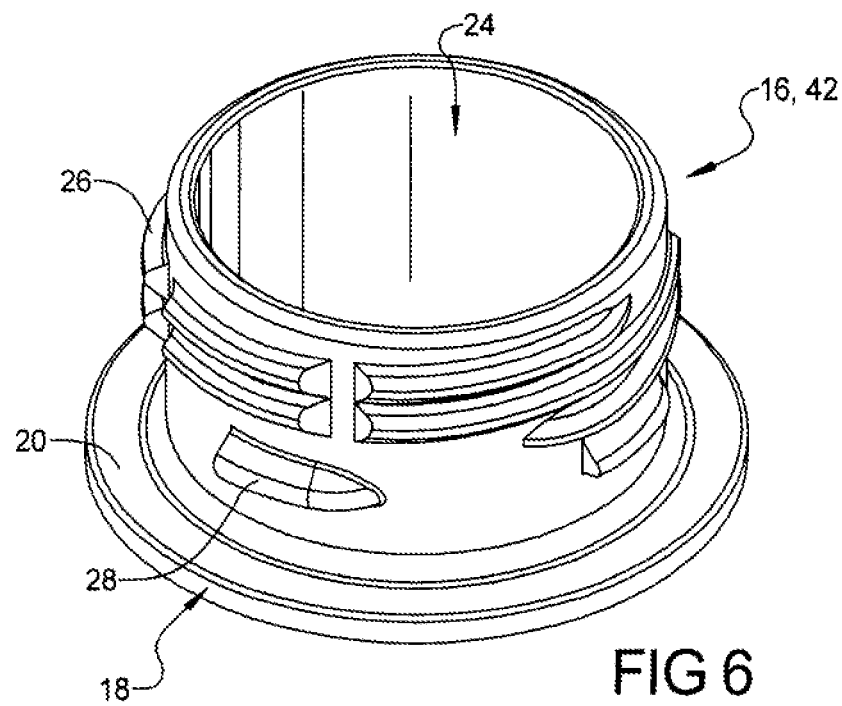
FIG. 6 is a perspective view of a neck portion of a container or preform according to an embodiment of the invention.

FIG. 5 illustrates a partial cross sectional view of an upper portion of a preform or a container formed from preform. In an embodiment, such as that generally illustrated, the vertical distance X from the top of the dispensing opening/neck portion (e.g., point 30) to the lower surface 22 of the support flange 18 (e.g., point 32) is 0.580 inches or less. For some embodiments, X may be 0.500 inches or less; for other embodiments, vertical distance X may be less than 0.450 inches. FIG. 6 illustrates a perspective view of an upper/neck portion of a preform or a container 16,42 according to another embodiment. As illustrated in the figure, the neck may include threading of the type that is commonly employed in connection with containers for holding carbonated contents.

Moreover, as generally illustrated, the vertical distance H from the top of the dispensing opening/neck portion (e.g., point 30) to the upper surface 20 of the support flange 18 may be 0.50 inches or less. For some embodiments, H may be 0.40 inches or less. Also, for some embodiments, the vertical distance D from the top of the dispensing opening/neck portion (e.g., point 30) to the lower surface of the tamper-evident formation (e.g., point 34) may be 0.30 inches or less.

In an embodiment, the vertical distance J from a furthest radially-extending portion of the lower surface of the tamper-evident formation 28 (e.g., point 36) to the upper surface 20 of the support flange 18, which generally equates to H minus D, may be 0.15 inches or less. For some embodiments, J may be 0.10 inches or less, and for other embodiments, vertical distance J may be less than 0.09 inches. For yet other embodiments, vertical distance J may be less than 0.08 inches.

Also, in an embodiment of the invention, the vertical distance between a furthest outwardly radially-extending portion of the lower surface of the tamper-evident formation (e.g., point 36) to the lower surface 22 of the support flange 18 at the same outward radial distance—which may generally equate or coincide with X minus D—is 0.20 inches or less, and for some embodiments may be 0.15 inches or less.

In an embodiment, support flange 18 has a radially extending length $L_1$ that is 0.20 inches or less. For some applications, length $L_1$ may be further reduced to 0.17 inches or less. With further reference to support flange 18, the angle—from horizontal—provided by a furthest outward radially extending portion of the lower surface 22 of support flange 18 (e.g., point 32) to the nearest radially-extending portion of the upper surface 20 of the support flange 18 is 16° or greater, and may be 20.0°±2°. However, for some embodiments, such as that generally depicted in FIG. 5, whereas a blending radius is provided to transition supporting flange 18 into an adjacent vertical portion of the neck (e.g., segment 39), the nearest radially-extending portion of the upper surface 20 of support flange 18 may be a theoretical position within supporting flange 18—e.g., point 38. Furthermore, for some embodiment, the least distance from a furthest radially-extending portion of the support flange (e.g., point 32) to the upper surface of the dispensing opening (e.g., at or about 30) is 0.60 inches or less, and for some neck portions may be 0.50 inches or less.

Embodiments of preforms and containers may have a neck portion that weighs 3.0 grams or less. For some embodiments, the weight of the neck portion can be 2.3 grams or less. Further, for a 500 ml version of a container made in accordance with an embodiment of the invention, the total weight of the preform and an unfilled weight of a container produced from such a preform may be 11 grams or less, and for some embodiments may be 10 grams or less. Of course, for many embodiments, without limitation, the preform and resulting container will weigh at least 9 grams.

By providing a neck portion 16 for a container 10 that incorporates one or more aspects of the foregoing embodiments, the center of gravity (see, e.g., 50 in FIG. 1) for the container may be lowered. For e.g., for a 500 ml container of with a configuration as generally shown in FIG. 1, the weight of the neck portion may be reduced from a conventional 3.4 to 2.0 g. Based on such a reduction in weight, the center of gravity (see, e.g., 50) may become at least about 0.48 inches lower than that provided for a similarly configured container having a 3.4 g finish—and will likely be about 0.48 and 0.58 inches lower than with the heavier (e.g., 3.4 g) conventional finish. Providing a neck portion in accordance with embodiments disclosed herein for such a container can provide a lowering of center of gravity as a percentage of height from bottom that ranged from about 4.5% to about 6% when compared to a similar container with a conventional 3.4 g neck portion. Moreover, when a container such as that discussed in this paragraph (e.g., 2.0 g neck portion/finish) is compared to a conventional container (e.g. 3.4 g neck portion/finish), the calculations provide a drop or lowering in center of gravity that provides an approximately 10.5% to 12.2% relative percent change (i.e., percent improvement).

It is noted that in addition to the material and economic benefits that may be achieved by "light-weighting" and lowering a comparative center of gravity in a resultant container, a lowering in the center of gravity of a preform may also provide certain manufacturing benefits. For example, without limitation, a preform with a comparatively lower center of gravity may provide for improved sorting and/or handling during production and manufacturing. That is, among other things, a preform with a lower center of gravity can provide for comparatively more stable or improved retention and processing. Similarly, a container with a lower center of gravity may exhibit improved handling, for instance, without limitation, in connection with de-palletizing or with "table top" conveying systems. Further, a lower center of gravity can provide a container, filled or unfilled, with improved stability. It is further noted, however, that the present invention is not limited to containers that are blown and filled in distinct or separate operations. That is, without limitation, preforms and containers provided in accordance with the teachings of the present invention also lend themselves for use in connection with various conventional "blow-and-fill" operations, including those in which a container is filled just after formation (e.g., within seconds of formation) in close proximity to where the container is formed. The operation comprising the blow-and-fill may be a single, integrated machine, or may be comprised of two or more separate devices that are adjacent or in close proximity to one another.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A plastic blow molded container, comprising:
    a lower supporting base portion;
    a sidewall portion extending upwardly from the base portion; and
    a neck portion extending upwardly from the sidewall portion, the neck portion including a support flange having an upper and lower surface; threads; a tamper-evident formation; and a dispensing opening at the top of the neck portion, the dispensing opening having a top;
    wherein the volume of the container is at least 500 ml; the weight of the neck portion is 3.0 grams or less; and the vertical distance from the top of the dispensing opening to the lower surface of the support flange, including the threads and the tamper-evident formation, is 0.58 inches or less.

2. The container according to claim 1, wherein the vertical distance from the top of the dispensing opening to the lower surface of the support flange is 0.50 inches or less.

3. The container according to claim 1, wherein the vertical distance from the top of the dispensing opening to the lower surface of the support flange is 0.45 inches or less.

4. The container according to claim 1, wherein the outside diameter of the support flange is greater than 22 mm and less than or equal to 39.2 mm.

5. The container according to claim 1, wherein the tamper-evident formation comprises a bead.

6. The container of claim 1, wherein the tamper-evident formation is discontinuous.

7. The container according to claim 1, wherein the radially extending length of the support flange is 0.20 inches or less.

8. The container according to claim 1, wherein the weight of the neck portion is 2.3 grams or less.

9. The container according to claim 1, wherein the ratio of the height of the center of gravity to container height is less than 0.57.

10. The container according to claim 1, wherein the container is comprised of polyethylene terephthalate (PET).

11. The container according to claim 1, wherein the threads comprise multiple-lead threads.

12. The container according to claim 1, wherein the combined weight of the neck portion, the sidewall portion, and the base portion is 11 grams or less.

13. The container according to claim 1, wherein the inner diameter of the dispensing opening is at least 22 mm.

14. The container according to claim 1, wherein the tamper-evident formation is vertically spaced from the threads.

15. A plastic blow molded container, comprising:
    a lower supporting base portion;
    a sidewall portion extending upwardly from the base portion; and
    a neck portion extending upwardly from the sidewall portion, the neck portion including a support flange having an upper and lower surface; threads; a tamper-evident formation; and a dispensing opening at the top of the neck portion, the dispensing opening having a top;
    wherein the container is comprised of polyethylene terephthalate (PET); the weight of the neck portion is 3.0 grams or less; the outside diameter of the support flange is greater than 22 mm and less than or equal to 39.2 mm; and the vertical distance from the top of the dispensing opening to the lower surface of the support flange, including the threads and the tamper-evident formation, is 0.58 inches or less.

16. The container according to claim 15, wherein the vertical distance from the top of the dispensing opening to the lower surface of the support flange is 0.50 inches or less.

17. The container according to claim 15, wherein the vertical distance from the top of the dispensing opening to the lower surface of the support flange is 0.45 inches or less.

18. The container according to claim 15, wherein the tamper-evident formation comprises a bead.

19. The container of claim 15, wherein the tamper-evident formation is discontinuous.

20. The container according to claim 15, wherein the radially extending length of the support flange is 0.20 inches or less.

21. The container according to claim 15, wherein the weight of the neck portion is 2.3 grams or less.

22. The container according to claim 15, wherein the ratio of the height of the center of gravity to container height is less than 0.57.

23. The container according to claim 15, wherein the threads comprise multiple-lead threads.

24. The container according to claim 15, wherein the combined weight of the neck portion, the sidewall portion, and the base portion is 11 grams or less.

25. The container according to claim 15, wherein the volume of the container is at least 500 ml.

26. The container according to claim 15, wherein the tamper-evident formation is vertically spaced from the threads.

27. The container according to claim 15, wherein the inner diameter of the dispensing opening is at least 22 mm.

28. A plastic blow molded container, comprising:
a lower supporting base portion;
a sidewall portion extending upwardly from the base portion; and
a neck portion extending upwardly from the sidewall portion, the neck portion including a support flange having an upper and lower surface; threads; a tamper-evident formation; and a dispensing opening at the top of the neck portion, the dispensing opening having a top;
wherein the container is comprised of polyethylene terephthalate (PET); the threads comprise multiple-lead threads; the combined weight of the neck portion, the sidewall portion, and the base portion is 11 grams or less; the weight of the neck portion is 3.0 grams or less; and the vertical distance from the top of the dispensing opening to the lower surface of the support flange, including the threads and the tamper-evident formation, is 0.58 inches or less.

29. The container according to claim 28, wherein the vertical distance from the top of the dispensing opening to the lower surface of the support flange is 0.50 inches or less.

30. The container according to claim 28, wherein the weight of the neck portion is 2.3 grams or less.

\* \* \* \* \*